(12) United States Patent
Ciavaglia et al.

(10) Patent No.: US 7,471,699 B2
(45) Date of Patent: Dec. 30, 2008

(54) STATION FOR OPTICAL NETWORK SUITABLE FOR INSERTING PACKETS INTO A STREAM OF PACKETS IN TRANSIT

(75) Inventors: Laurent Ciavaglia, Fontainebleau (FR); Nicolas Le Sauze, Bures-sur-Yvette (FR); An Ge, Plano, TX (US)

(73) Assignee: Alcatel, Paris (FR)

( * ) Notice: Subject to any disclaimer, the term of this patent is extended or adjusted under 35 U.S.C. 154(b) by 598 days.

(21) Appl. No.: 11/219,830

(22) Filed: Sep. 7, 2005

(65) Prior Publication Data
US 2006/0056452 A1 Mar. 16, 2006

(30) Foreign Application Priority Data
Sep. 8, 2004 (FR) .................................. 04 51986

(51) Int. Cl.
*H04J 14/08* (2006.01)
(52) U.S. Cl. ..................... 370/471; 370/528; 398/73
(58) Field of Classification Search ................ 370/465, 370/470, 471, 528; 398/73
See application file for complete search history.

(56) References Cited

U.S. PATENT DOCUMENTS

| 6,493,120 | B1 * | 12/2002 | Tancevski | 398/47 |
|---|---|---|---|---|
| 2002/0118420 | A1 * | 8/2002 | Liu | 359/139 |
| 2005/0008368 | A1 * | 1/2005 | Zami et al. | 398/70 |
| 2006/0140184 | A1 * | 6/2006 | Youn et al. | 370/389 |
| 2007/0177588 | A1 * | 8/2007 | Lee et al. | 370/389 |

FOREIGN PATENT DOCUMENTS

| EP | 1 030 534 A2 | 11/1999 |
|---|---|---|
| EP | 1 496 720 A1 | 1/2005 |

OTHER PUBLICATIONS

L. Tancevski et al, "Optical Routing of Asynchronous, Variable Length Packets", IEEE Journal on Selected Areas in Communications, IEEE Inc., New York, US, vol. 18, No. 10 Oct. 2000, 1000, pp. 2084-2093, XP000976897.
R. TEng, "A Comparison of the JIT, JET< and Horizon Wavelength Reservation Schemes on a Single OBS Node", Proc. of the First International Workshop on Optical Burst Switching, Online! Oct. 31, 2003, XP002327872.

* cited by examiner

*Primary Examiner*—Melvin Marcelo
(74) *Attorney, Agent, or Firm*—Sughrue Mion, PLLC

(57) ABSTRACT

In a network including an optical link transporting packet streams of successive optical packets separated by voids, the station includes a transmission device (13) coupled to the link at an insertion point in order to inject optical packets into the link. At a detection point on the link, upstream of the insertion point, a detection device (11) observes the packet streams transported to this detection point. As a function of this observation each packet awaiting transmission and transmitted by the transmission device (13) causes the formation at the insertion point of a downstream packet stream containing the transmitted packet interposed between first and second packets delimiting a void of the upstream stream. The detection device (11) forms a transmission control signal (ACK) such that in the event of transmission as a function of this control signal, any transmitted packet is attached to at least one of the first and second packets.

6 Claims, 5 Drawing Sheets

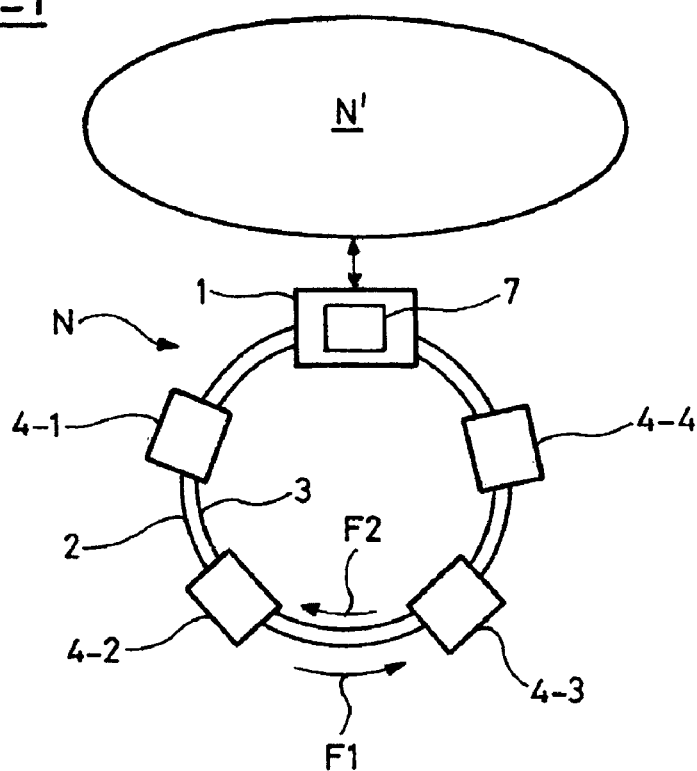
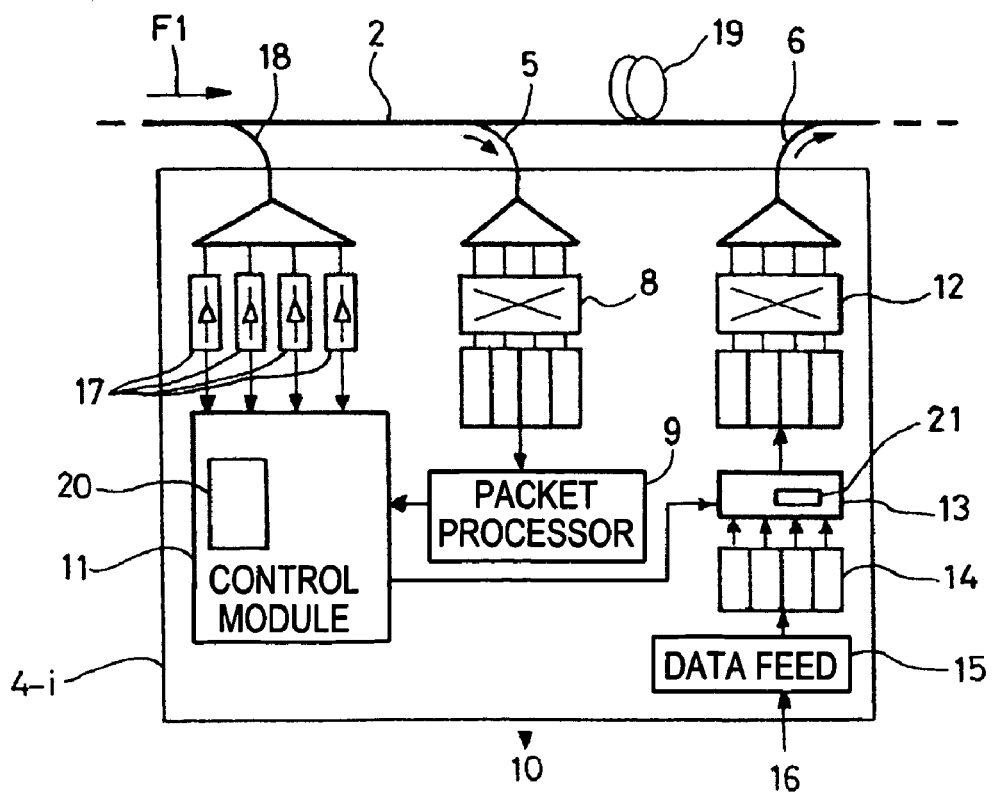

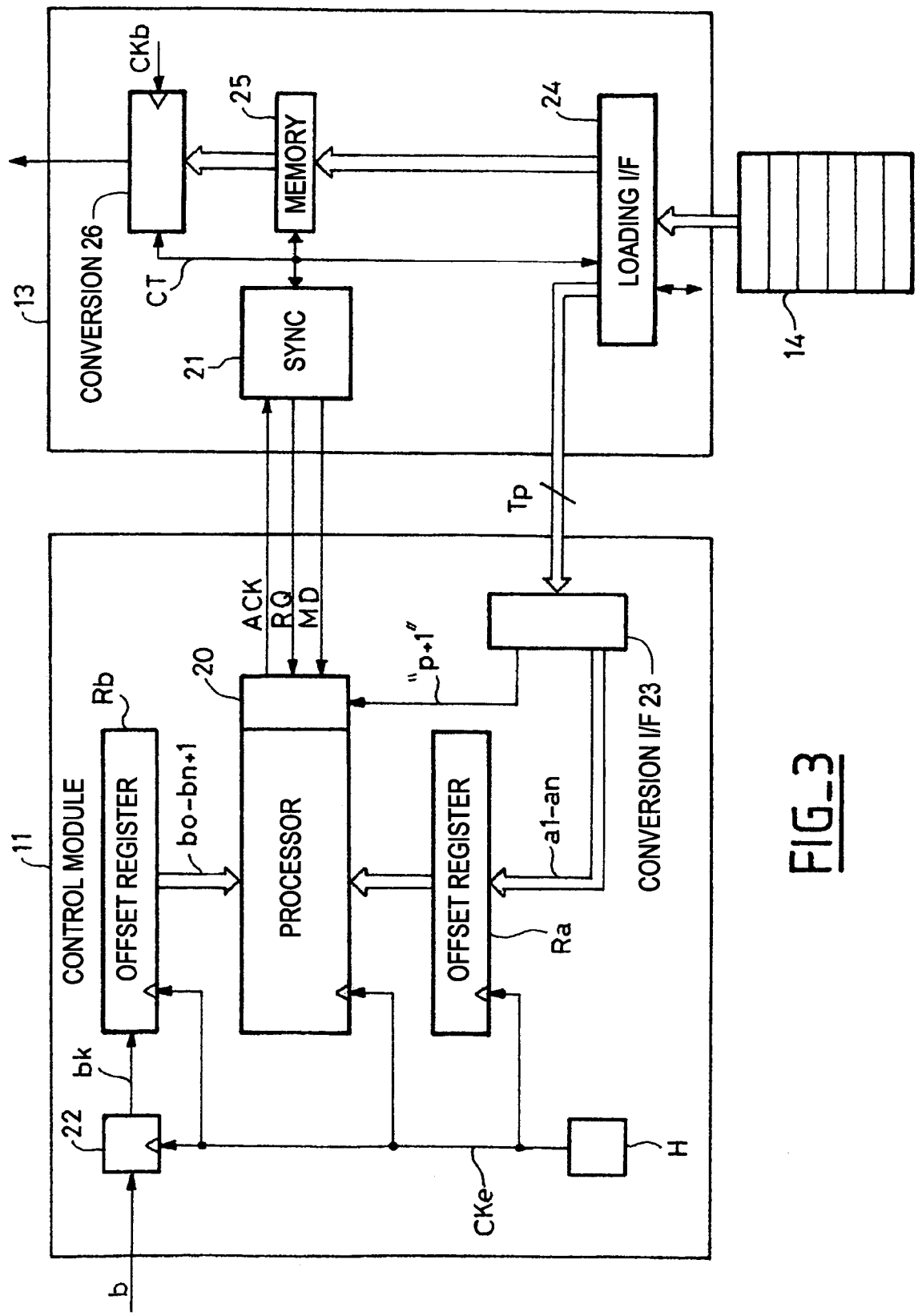
FIG_3

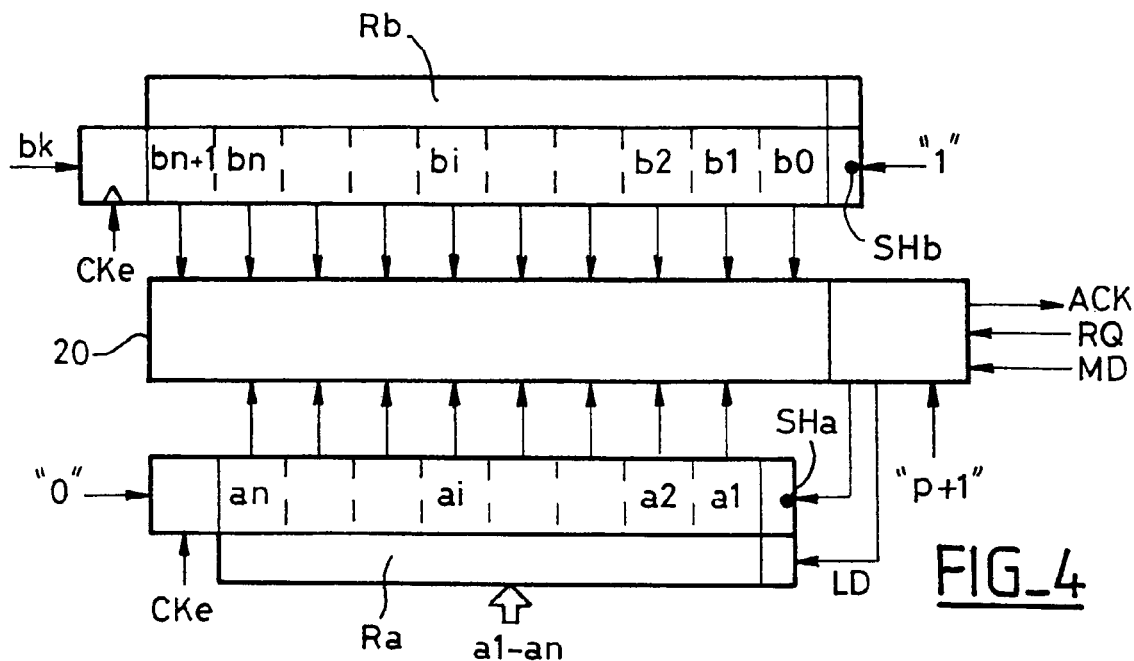
FIG_4
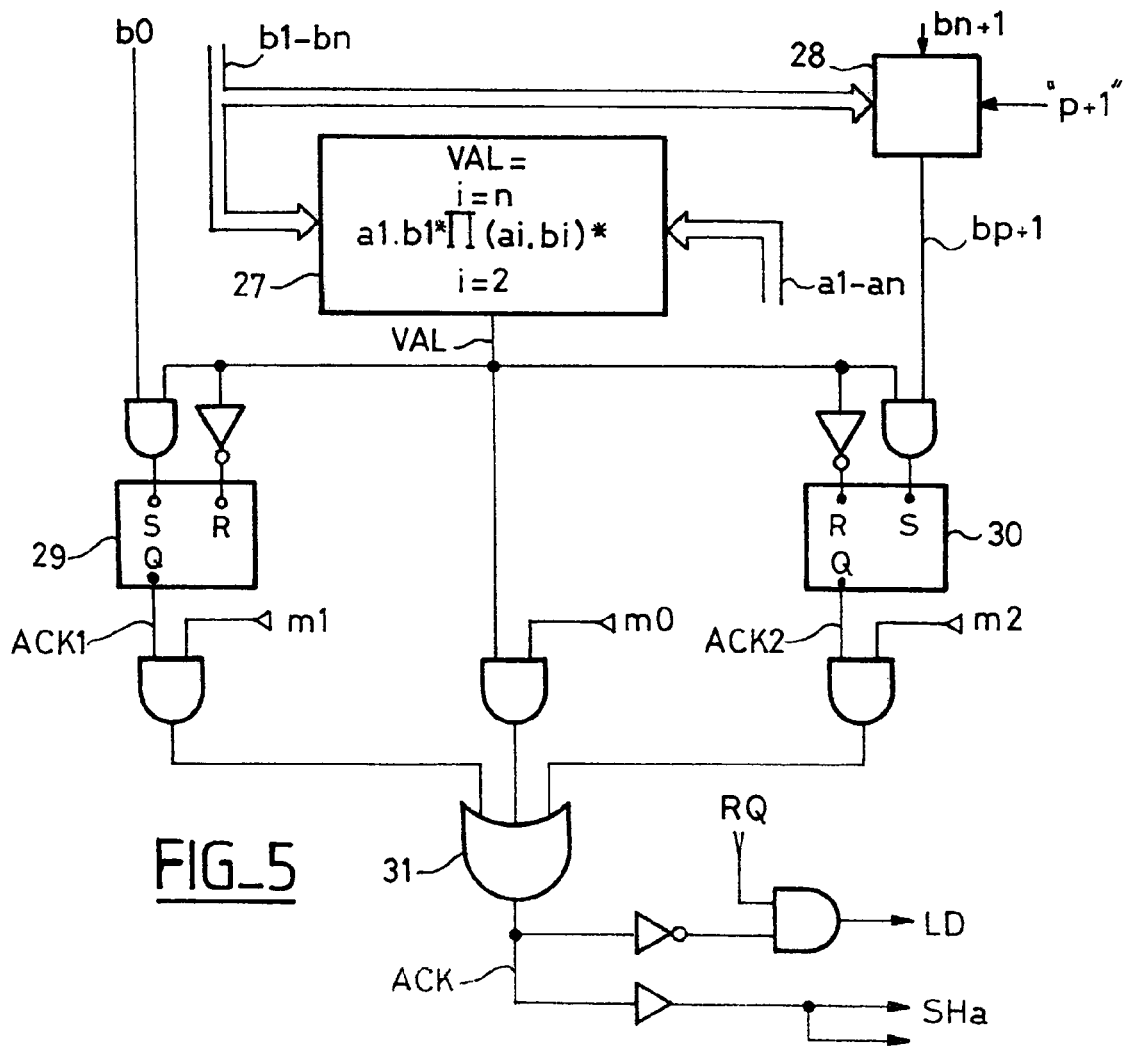
FIG_5

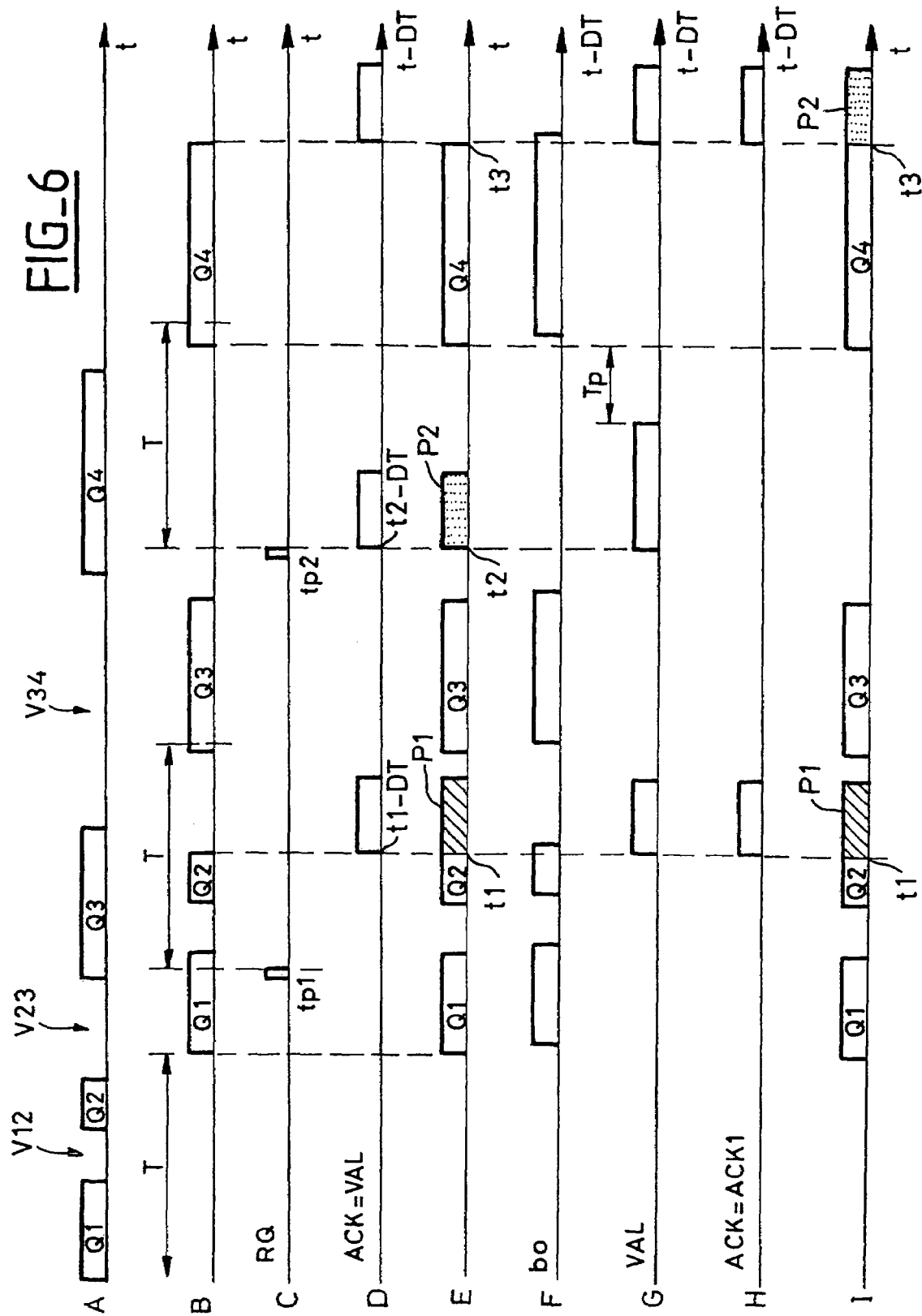

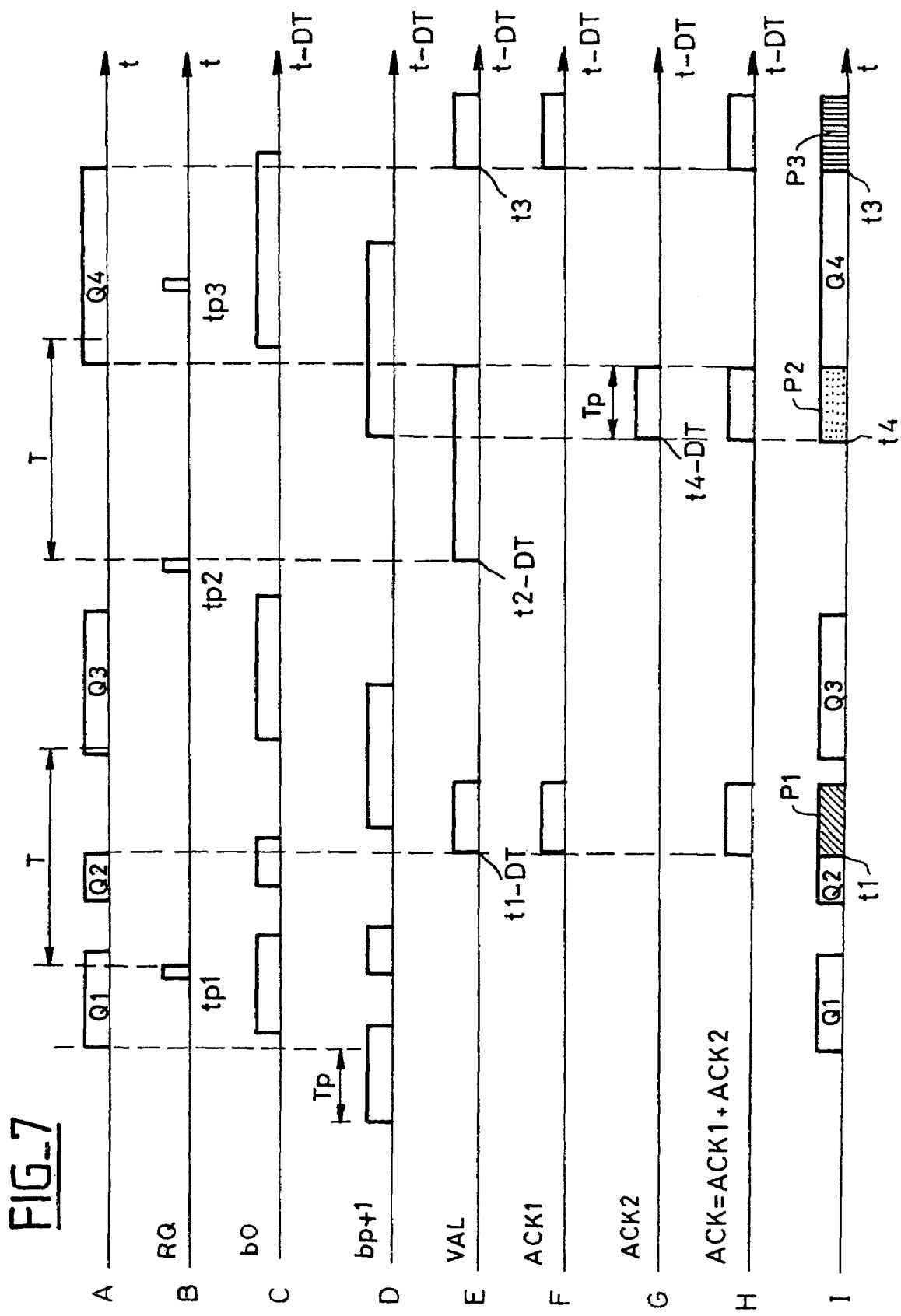

STATION FOR OPTICAL NETWORK SUITABLE FOR INSERTING PACKETS INTO A STREAM OF PACKETS IN TRANSIT

The invention relates to the field of data transmission in optical networks, these data being transported in optical links in the form of optical signals organized in packets.

The invention may apply in particular to (Dense) Wavelength Division Multiplexing ((D)WDM) ring networks.

In a general manner, an optical network consists of a plurality of stations capable of transmitting and receiving optical signals to and from other stations of the network. These information interchanges are carried out by means of optical links to which are connected access nodes which respectively serve these stations.

Certain networks of the aforementioned type, such as for example the metropolitan access network called "DBORN" (for "Dual Bus Optical Ring Network"), comprise communication stations coupled to at least one common optical fiber, suitable for the transmission of wavelength division multiplexed optical signals and using a "void filling" protocol. For each wavelength and for each station, this protocol is used to manage the insertion of the packets awaiting transmission amongst the packets in transit at the station. Such a network has in particular been the subject of the presentation "DBORN: a shared WDM Ethernet bus architecture for optical packet metropolitan networks" at the Photonics in Switching conference, PIS'2002, Cheju Island, Korea, July 2002, TuC3.

"Void" here means an empty temporal emplacement, that is to say containing no packet, between two consecutive packets belonging to a stream (or flow) of successive packets being transmitted by an optical link.

The implementation of this protocol at a station relies on the observation of the traffic corresponding to each wavelength within the transmission optical fiber, combined with the use of an optical delay line interposed in the optical link.

More precisely, the network therefore comprises an optical link intended to transport packet streams consisting of successive optical packets each carried by a common wavelength and being propagated in a given direction. A station of this network then comprises a transmission device coupled to the optical link at an "insertion" point in order to be able to inject into the link optical packets carried by this common wavelength, the injected packets then being propagated downstream in the aforementioned direction.

The station is also intended, at a point on the link, called the "detection" point, situated upstream of the insertion point, to observe the "upstream" packet streams originating from various transmission sources disposed upstream and transported, still in this same direction of propagation, to this detection point. With respect to the station in question, the observed packets are packets in transit, that is to say packets that must continue to be propagated in the link downstream of the station.

The station is then provided in order that, as a function of this observation, each packet corresponding to data that is awaiting transmission and that will effectively be transmitted by the transmission device causes the formation at the insertion point of a "downstream" packet stream, this downstream stream containing this transmitted packet, which will be interposed between two consecutive packets in transit, that is to say between two packets delimiting a void of the upstream stream having a temporal "size" sufficient to contain the entirety of the transmitted packet.

In practice, the size of a void will be considered "sufficient" if it is at least equal to the size strictly speaking of the packet to be transmitted, that is to say the duration of transmission of the data that constitute it, to which is added an additional fixed duration equal to twice a temporal space, called "guard band" (or "guard time"), which is a minimal duration imposed to separate two consecutive packets, particularly in order to allow, in receive mode, easier extraction of each packet from a received stream. This additional duration will henceforth be considered to be integrated into the size of the packet if an "effective" packet size is defined as the sum of the size strictly speaking of this packet to be sent and this additional duration.

The effective triggering of the transmission of a packet to be transmitted will then be conditional upon the result of a comparison between the size of the voids observed in the upstream stream and the "effective" size of the packet. It should be noted that this additional duration may take a chosen value which contrives a certain margin of tolerance, particularly in order to take account of the inevitable inaccuracy on the time separating the moment when the result of the obtained comparison is favorable and the moment when the transmitted packet will be effectively injected into the fiber.

Taking account of the optical nature of the packets which cannot be stored without conversion into the electrical domain, provision is made, between the detection point and the insertion point, of an optical delay line one role of which is to delay the packets in transit for a sufficient duration to allow the station to carry out the appropriate operations, that is to say to determine whether a void observed at the detection point is of a sufficient size for the waiting packet, then to inject the totality of the packet into the fiber (while contriving the required guard bands) before the end of this void has passed the insertion point. The delay line must also be of a sufficient length to be able to detect void sizes at least equal to a predicted maximal packet size. For example, in an Ethernet protocol network, the longest packets comprise approximately 1500 octets, which, for a given bit frequency, allows the corresponding maximal temporal size to be deducted therefrom. In what follows, it will be assumed that the delay line is part of the station.

An insertion process of this type implemented in each of the stations of a network has the advantage that the management of the network is distributed amongst the stations, without requiring centralized means of control or of synchronization which would involve permanent interchanges of specific signals of control, of synchronization and of command. This results in good flexibility, particularly because stations can be added or removed without impacting the configurations of the other stations or other transmitters or receivers of the network. Furthermore, for each station, the temporal sizes of the transmitted packets are imposed only in the limit of a maximal size conditional upon the choice of the delay line.

For an implementation of the insertion process of this type, the station must be designed to process in real time all the cases that arise.

More precisely, in fact several situations can be distinguished that the station is capable of detecting and must be able to take into account:

1/ At least one packet is waiting, but the station does not detect any void of sufficient size in the upstream packet stream.

2/ At least one packet was waiting and the station has just detected a void of sufficient size.

3/ The station detects the appearance of a void, but no packet is waiting.

4/ The station had detected the appearance of a void whereas no packet was waiting and it detects the arrival of a new packet waiting whereas the detected void is still present and is of sufficient size.

In cases 1/ and 3/, the station naturally performs no transmission. For the other cases 2/ and 4/, it may seem natural that the station is intended to trigger the insertion as soon as possible. Thus, for the case 2/, at least one packet being waiting, as soon as a void of sufficient size is detected in the upstream packet stream, the station will trigger the transmission of a packet as soon as possible, that is to say at a moment such that the transmitted packet will cause the formation at the insertion point of a downstream packet stream where this transmitted packet is "attached" following the first packet delimiting the detected void. The term "attached" means in practice that the transmitted packet is temporally separated from the end of the first packet by a time interval less than a maximal determined value, this maximal value preferably being the smallest possible, but without being less than the guard band previously mentioned.

In the case 4/, a packet can be transmitted as soon as a new waiting packet appears. Thus, its transmission as soon as possible will have the effect of forming at the insertion point a downstream packet stream in which this transmitted packet is always situated inside a void, but in a position which depends only on the moment of appearance of the new waiting packet, that is to say without necessarily being attached to a packet of the upstream stream.

This operation is optimal in order that the packets which the station must send experience minimal waiting times. This property is worthwhile for the station but may however have unfavorable consequences on the whole of the network.

Specifically, in the type of network in question, the average rate of occupancy of the link by packets increases from upstream to downstream at each station encountered. If upstream of a station in question the number of stations and/or their transmission activities increases, the percentage of voids in the packet stream upstream of this station will diminish. Now, by applying the operation described above in each station, the further downstream a station is placed, the greater the probability of observing therein upstream packet streams which have a greatly fragmented temporal space empty of packets, that is to say comprising many voids whose sizes are too small for packets to be inserted in them. The probability of encountering such voids depends on the types of traffic generated respectively by the various upstream stations, but in all cases will increase with the number of stations.

The object of the invention is to propose another solution which does not have this disadvantage. For this purpose, the subject of the invention is a station for optical transmission network, this network comprising at least said station and an optical link provided for transporting packet streams consisting of successive optical packets each carried by a common wavelength and being propagated in a given direction, a time interval separating two consecutive packets of a packet stream being called a "void", said station comprising a transmission device coupled to said link at an insertion point and suitable for injecting into the link of the optical packets carried by said common wavelength, the station being provided in order to observe at a detection point of the link situated upstream of said insertion point the "upstream" packet streams transported to this detection point and in order that, as a function of this observation, each packet corresponding to data awaiting transmission and transmitted by said transmission device causes the formation at the insertion point of a "downstream" packet stream. This downstream stream containing said transmitted packet interposed between first and second packets delimiting a void of said upstream stream, characterized in that said station comprises a device for detection of said "upstream" packet streams suitable for forming a transmission control signal such that in the case of transmission by the transmission device as a function of said control signal, any packet transmitted and interposed between said first and second packets delimiting a void, which is therefore of sufficient size, is attached to at least one of said first and second packets, that is to say is temporally separated either from said first packet, or from said second packet by a time interval less than a maximal determined value.

Thanks to the invention, the imposition can be made that the insertion of each packet in a void of the upstream stream will have the sole effect of reducing its size to a value equal to the difference between its initial size and the effective size of the inserted packet.

On the other hand, with the operation previously envisaged, a packet may be inserted without being attached, which creates two voids each being of a size smaller than the difference indicated above. The risk of a profusion of voids that are too small for packets to be inserted therein is therefore increased. The invention makes it possible to avoid it, which is particularly beneficial for the stations placed furthest downstream on the link, in networks in which the upstream stations may generate very different respective traffics.

According to a first possibility, said first packet designating that which precedes said second packet, the control signal is such that any packet transmitted as a function of this control signal is attached exclusively to said first packet.

This solution is the simplest to apply because the observation of the voids remains simple.

According to a variant of the invention, provision can be made on the contrary that said control signal is such that any packet transmitted as a function of this control signal is attached exclusively to said second packet.

The latter possibility is less easy to apply, but may be of interest if the requirement is also to act on the order of succession of the packets in the formed packet streams.

According to a preferred embodiment, said control signal is such that any packet transmitted as a function of this control signal is attached as a priority to said first packet, and naturally failing this, but only failing this, it will be attached to said second packet.

Thus, for any packet available to be transmitted at a moment not allowing it to be attached following the first packet delimiting a detected void, the system does not await the detection of a subsequent void of sufficient size to attach it to the first packet delimiting this subsequent void. The latter solution has the advantage of giving the waiting packets a better probability of being inserted within a short time, because the waiting time before this subsequent void is presented may be very long if the upstream traffic is considerable.

Thus, the three preceding possibilities correspond to three possible modes of operation of the stations of a network. The stations can thus be configured selectively according to these three modes, and therefore they can be given different insertion priorities, for example if it is required to compensate for the fact that the stations furthest downstream are at a disadvantage for inserting their packets.

In one aspect of implementation complying with the invention, the station comprises a timing device in order to measure the elapsed time from the moment when the data awaiting transmission corresponding to a packet to be transmitted are detected, being said detection device for suitable forming a validation signal such that in the event of transmission by the transmission device in response to this validation signal, any transmitted packet is interposed between said first and second packets delimiting a void, said timing device being provided in order to trigger the transmission of said packet to be sent in response to said validation signal, independently of said transmission control signal.

The invention also relates to a network comprising an optical link and at least one station complying with the preceding definitions.

Other aspects and advantages of the invention will appear in the rest of the description with reference to the figures.

FIG. 1 represents an example of a metropolitan access network in which the invention may be applied.

FIG. 2 represents schematically an example of a station of the network in FIG. 1 in which a void-filling protocol applied to several wavelengths is used.

FIG. 3 shows a detection device control module and an electronic circuit of a transmission device according to one embodiment of a station according to the invention.

FIGS. 4 and 5 show details of an exemplary embodiment of a detection device control module fitted to a station according to the invention.

FIG. 6 represents timing charts A to I of various signals involved and used to explain the operation of the station according to the invention.

FIG. 7 represents timing charts A to I of various signals involved and used to explain the function of the station according to a preferred embodiment of the invention.

An example of a context of use of the invention is first explained with the aid of the network represented schematically in FIG. 1.

In the following, it is assumed that the network is a (Dense) Wavelength Division Multiplexing ((D)WDM) ring network like the metropolitan telecommunications access network of the DBORN type. But, the invention is not limited solely to this application. It also relates to optical link networks of the "optical bus" type, that is to say shared between several stations, also known under the name of "multiple access networks".

The ring network N illustrated in FIG. 1 comprises, conventionally, a main access node (or hub) 1, to which is connected at least one of the two ends of optical fibers 2, 3 intended for the transmission of data in optical packet form, and several user stations 4-i (here for example i=1 to 4), optically coupled to the fibers 2, 3 via coupling means which will be described later with reference to FIG. 2.

The ring network N is usually connected to another "backbone" network N', via the access node 1.

As mentioned above, the network N comprises a first optical fiber 2 dedicated to the uplink traffic from the stations 4-i to the access node 1 (arrow F1) and a second optical fiber 3 dedicated to the downlink traffic from the access node 1 to the stations 4-i (arrow F2). But it is possible to envisage a simplified network N in which only a single fiber dedicated to both types of traffic (uplink and downlink) is provided. Furthermore, it is also possible to envisage that the network N comprises at least one other optical fiber dedicated to the protection of the traffic in case of failure occurring on the first optical fiber 2 and second optical fiber 3.

The access node 1, which is typically of the electronic type, comprises storage means, like electronic memories, intended to store the traffic, at least temporarily, and an electronic switch 7, of the Ethernet or IP type, fitted with O/E/O (optical/electrical/optical) conversion in order to be able to access all the traffic circulating in the ring. Such an access node performing these functions is usually called a "hub".

Furthermore it should be noted that, in a ring network N, of the DBORN type, it is possible to choose that the stations 4-i may not communicate with one another directly. When they want to communicate with one another, they must first of all transmit their data (in optical signal packet form), via the first fiber 2, to the access node 1, which takes the responsibility of retransmitting them to the station concerned via the second fiber 3. Consequently, in this type of ring network, the filling mechanism according to the invention, which will be described hereafter, applies only to the first fiber 2 dedicated to the uplink traffic.

Reference will now be made to FIG. 2 in order to describe the main subassemblies constituting one of the stations 4-i of the network.

In the exemplary embodiment illustrated, the station 4-i is coupled only to the first fiber 2 so as not to overload the connections. But its coupling to the second fiber 3 (illustrated in FIG. 1) may be envisaged. Furthermore, it is assumed here, as an example, that the four stations of the network in FIG. 1 use in transmission mode one and the same set of four wavelengths $\lambda 1$ to $\lambda 4$. But, naturally, it could be otherwise.

For the receive functions, the station 4-i first of all comprises a reception module 8 coupled to the first optical fiber 2 by a passive optical coupler 5, of the 2×1 type. Here, the reception module 8 is more precisely made up of a demultiplexer feeding a switch, which in turn feeds four receivers dedicated respectively to four reception wavelengths. These four receivers are coupled to an extracted packet processing circuit 9 feeding an output 10 coupled to a terminal not shown.

For the transmission functions, the station 4-i comprises a transmission device consisting essentially of a transmission module 12, an electronic circuit 13, memories 14 and a data feed module 15.

The transmission module 12 is coupled to the fiber 2 by a passive optical coupler 6 of the 2×1 type. The position of the coupler 6 will thus materialize a packet insertion point in the fiber 2.

Here, the transmission module 12 more precisely consists of four sources of optical signals, based on lasers, delivering carrier waves of four different wavelengths $\lambda 1$ to $\lambda 4$ and amplitude modulated in order to form the optical packets to be transmitted in the fiber 2, a switch fed by the sources, and a multiplexer fed by the switch and connected to the passive coupler 6.

The sources of the transmission module 12 are controlled by the electronic circuit 13 responsible, on the one hand, for reading the contents of the memories 14, preferably of the FIFO type, according to the speeds defined as a function of a detection of voids in the upstream traffic, and on the other hand for formatting the data read in the memories 14 before they are converted and transmitted in optical packet form by the sources of the module 12. The memories 14 are furthermore fed with data and controlled by the data feed module 15 in turn connected to the terminal via a link 16.

For the function of detecting voids in the upstream traffic, the station 4-i comprises a detection device here consisting essentially of four detectors 17 and one control module 11.

The detectors 17 are respectively responsible for observing on the fiber 2 the traffic carried by the four wavelengths $\lambda 1$ to $\lambda 4$ in order to deliver to the control module 11 detection signals representative of the "upstream" traffic, that is to say transported by the fiber 2 and present at a detection point materialized by the position of a coupler 18 disposed upstream of the couplers 5 and 6 and separated from them by an optical delay line 19 inserted in the fiber 2.

Each detector 17 is therefore coupled to the fiber 2 via the coupler 18 of the 1×2 type followed by a wavelength demultiplexer.

To apply the invention, the station comprises specific means, particularly a processing module 20 (shown arbitrarily in FIG. 2 as being part of the control module 11) taking into account for each wavelength the observation of the upstream traffic and the state of the transmission device (presence and size of the packets awaiting transmission).

FIG. 3 shows schematically a possible embodiment of the control module 11 and of the electronic circuit 13 applying the invention for a particular wavelength.

The control module 11 essentially comprises the following functional elements:

- the processing module 20;
- first and second offset registers Ra, Rb assigned respectively to the packets awaiting transmission and to the upstream packet stream and each having parallel outputs connected to the module 20;
- a formatting circuit 22 receiving a detection signal b supplied by one of the detectors 17 and having an output connected to an input for serial loading of the register Rb;
- a conversion interface 23 receiving from the circuit 13 an item of information Tp representative of the effective size of each new packet ready to be sent, and having parallel outputs a1-an connected to counterpart parallel inputs of the register Ra and another output "p+1" connected to the module 20;
- a source H of sampling clock signal CKe connected to the module 20, to the registers Ra, Rb and to the circuit 22.

The circuit 13 essentially comprises the following elements:

- a synchronization module 21;
- an output buffer memory 25;
- a loading interface 24 having parallel inputs connected to counterpart parallel outputs of the memory 14, first parallel outputs connected to counterpart parallel inputs of the buffer memory 25, second parallel outputs for supplying the conversion interface 23 with the aforementioned size information Tp;
- a parallel-serial conversion circuit 26 having parallel inputs connected to counterpart parallel outputs of a buffer memory 25 and synchronized by a bit clock signal CKb whose frequency is a predefined multiple of that of the sampling clock signal CKe.

The synchronization module 21 also communicates with the buffer memory 25, the conversion circuit 26 and the data feed module 15, via the loading interface 24, by control lines CT not shown in detail. The synchronization module 21 also communicates with the processing module 20 by means of signals RQ, MD, ACK.

The signal RQ is a request for authorization to transmit a waiting packet, intended for the processing module 20 and transmitted by the synchronization module 21. The signal ACK is a transmission authorization signal intended for the synchronization module 21 and transmitted by the processing module 20 in response to an earlier request for authorization to transmit RQ. The signal MD is an insertion mode signal which will be explained later.

The circuit 13 operates in the following manner. Initially, if at least one packet is waiting in the memory 14, this state is signaled to the synchronization module 21 by the data feed module 15 and a selected packet (for example the one waiting the longest and which benefits from the highest privileged quality of service class) is loaded into the buffer memory 25 via the loading interface 24. Simultaneously, the interface 24 transmits via its parallel outputs Tp a data item representative of the size of the packet loaded into the buffer memory 25 and the synchronization module 21 sends to the processing module 20 a transmission authorization request RQ.

In response to the request RQ and as a function of the information on the size of the packet Tp and of the observation of the upstream stream, the processing module 20 determines the time at which the transmission of a packet must be triggered and notifies the synchronization module 21 thereof for example by setting the transmission authorization signal ACK to 1. In response to the signal ACK, the synchronization module 21 activates the conversion circuit 26 to trigger the transfer of the packet present in the buffer memory 25 to the conversion circuit 26 which then proceeds with the serial transmission of the packet at the speed of the bit frequency CKb. Simultaneously, the synchronization module 21 authorizes the loading of a new waiting packet into the memory 14. If the latter is not empty, a new packet is loaded into the buffer memory 25 via the loading interface 24 and the process is repeated as before.

FIG. 4 shows in greater detail the constitution of the offset registers Ra, Rb and of the signals interchanged with the processing module 20. FIG. 5 explains in logic circuit form the logic functions that can be executed by the processing module 20. Explanations on these figures will be given during the subsequent description of the operation of the whole station, with the aid of FIGS. 6 and 7.

As already indicated, the observation of the upstream traffic for a given wavelength uses one of the detectors 17 typically produced by means of a simple photodiode in the case when the optical signals result from an amplitude modulation of carrier waves. The detection signal b which it provides is therefore an electric signal whose amplitude follows the variations of the optical power, for the received wavelength, present at the detection point.

The detection signal b is received by the formatting circuit 22 which carries out an integration of this signal and a sampling at the speed of the sampling frequency CKe in order to constitute a succession of binary signals bk representative of the absence or the presence of packets during the successive sampling periods. For example, it can be agreed that the presence of a packet during a given sampling period will correspond to a logic value "1" and its absence to a logic value "0".

Naturally, if the optical signals result from a modulation other than a simple amplitude modulation (for example, optical phase modulation with packet delimitation patterns), the means of observation of the upstream traffic should be adapted in consequence, but still result in constituting the succession of binary signals bk.

The successive samples bk thus obtained are applied to the serial input of the offset register Rb, permanently commanded in offset to the right (command SHb symbolized at "1" on the right of FIG. 4), in order to be loaded therein at the speed of the sampling frequency CKe.

Thus, at each moment the logic states of the different stages $b0, \ldots, bi, \ldots, bn, bn+1$ of the register Rb (see FIG. 4) constitute a temporal representation of the upstream packet stream observed on a temporal window of a width equal to $(n+2)Te$, while Te designates the sampling period.

Furthermore, the register Ra is intended to be loaded by its parallel input with a set of bits $a1, \ldots, ai, \ldots, an$ which constitute in analogous manner a temporal representation of a packet awaiting insertion. With the preceding convention, a packet of a size between $(p-1)Te$ and $pTe$ will be represented by $ai=1$ for $1 \leq i \leq p$ and $ai=0$ for $p+1 \leq i \leq n$. A given "real" packet size Tp will correspond to a value of p which will be determined by the "effective" size of the packet, that is to say by taking into account the guard bands to be provided and a margin of tolerance. It may be noted here that the number n of stages of the register defines the maximum packet size that can be handled by the device.

The serial input of the register Ra (symbolized by "0" on the left of FIG. 4) is furthermore permanently clamped at 0. The parallel loading of the register Ra or its offset to the right are commanded respectively by the signals LD and SHa originating from the module 20 in conditions that are specified below.

When a packet is transferred to the memory 25, the interface 23 generates the corresponding bits a1-an according to the packet size Tp and places them at the parallel input of the register Ra. The module 21 then transmits the request RQ and, on its reception, the module 20 sends to the register Ra the command LD for parallel loading. The register Ra then contains the bits a1-an associated with the packet present in the memory 25.

When the register Ra is thus loaded, a comparison of the contents of the registers Ra and Rb is then used to determine at any moment whether a void in the upstream stream of a size at least equal to that of the waiting packet may be used to contain the packet after its insertion at the insertion point.

This situation may be signaled by a validation logic signal VAL representative of the moments when insertion will be possible (VAL=1) or not (VAL=0). With the preceding conventions, there will be:

$VAL=(a1.b1^*)\pi(ai.bi)^*$, $b1^*$ and $(ai.bi)^*$ being respectively the complements of $b1$ and of $ai.bi$, the logic product $\pi$ being applied for i lying between 2 and n.

If, as a function of the transition to 1 of the signal VAL, a transmission of the waiting packet contained in the memory 25 is triggered by the transmission authorization signal ACK being set to 1, the module 20 activates the command SHa. The register Ra operates in offset to the right, while loading by the left the logic value 0 at each sampling period. Since the register Rb also operates in offset to the right, the signal VAL will remain at 1 so long as a1 remains at 1. That is to say for a duration equal to that of the effective complete transmission of the packet concerned, then it will return to 0 at the same time as a1.

It should be noted that the transmission authorization signal ACK must be taken into account by the synchronization module 21 based on its reception after a clearly defined delay. The value of this delay will take into account the respective propagation times in the delay line and the various processes by the transmission device, such that the moment of the beginning of effective transmission of the packet in the fiber determined by the moment that the signal ACK is set at 1 coincides to the best possible degree with the arrival at the insertion point of the portion of the upstream stream that was represented by the bits b1-bn contained in the register Rb at the moment when the signal ACK switched to 1.

If it is required to transmit the waiting packet at the earliest possible moment, the transition to 1 of the signal VAL must be used directly as the transmission control signal ACK to trigger the transmission of a waiting packet. This will then give the operation illustrated by the timing charts A to E of FIG. 6.

The timing chart A represents an example of an upstream packet stream observed at the detection point. The successive packets Q1, Q2, Q3, Q4 are spaced by the successive voids V12, V23, V34. Timing chart B shows the same stream observable at the insertion point at the input of the coupler 6, that is to say delayed by a duration T as a function of the delay line 19. The timing chart C represents an example of a transmission authorization request RQ.

To simplify the presentation of the timing charts, rather than show at the same moments the signals ACK and VAL originating from the module 20, the timing chart D represents delayed signals ACK and VAL which correspond to the effects that the signals ACK and VAL produce at the insertion point after an appropriate delay DT.

If for example a transmission authorization request RQ is transmitted at the moment tp1 (see timing chart C) for a first packet P1 (see timing chart E), the validation signal VAL will be set to 1 at a moment t1–DT, since the size of the packet P1 will have been detected at this moment to be smaller than that of the void V23.

Using the signal VAL as a transmission control signal ACK (see timing chart D), the insertion of the packet P1 will begin at the moment t1 and, if the delay DT is well chosen, it will be attached to the packet Q2, following the latter (see timing chart E).

If however a transmission authorization request RQ is transmitted at the moment tp2 (see timing chart C) for a second packet P2 (see timing chart E), the validation signal VAL will be set to 1 at the moment t2–DT, since the size of the packet P2 will have been detected to be smaller than that of the void V34. Still using the signal VAL as a transmission control signal ACK (see timing chart D), the insertion of the packet P2 will begin at the moment t2, but in this example it will not be attached to any packet of the upstream stream as is shown in timing chart E of the downstream stream resulting therefrom.

To avoid this situation, it is necessary according to the invention to create another transmission control signal ACK which ensures that an inserted packet is in all cases attached to a packet of the upstream stream.

According to a first approach, it may be sufficient to ensure that any inserted packet is attached following a packet of the upstream stream, always on condition naturally that it precedes a void of sufficient size for the packet to be inserted.

This may be achieved by providing first that the register Rb comprises a supplementary stage b0 placed at the right of the register. The state 1 of this stage, while the following stages b1, b2, . . . are at 0, constitutes an indication that, in the observed temporal window, the stage b0 corresponds to the end of a packet in transit, that is to say that the stage b1 corresponds to the beginning of a void. Then, to ensure that the packet can be inserted in a void, while being attached following the packet of the upstream stream that precedes this void, the signal ACK1 will be taken as the transmission control signal ACK which takes the value 1 as soon as the logical product VAL.b0 switches to 1, ACK1 then remaining at 1 so long as VAL remains at 1.

In the preceding example, the timing charts F, G and H represent respectively the signals b0 (logic state of the stage b0), VAL and ACK1 delayed by the previously defined value DT. The timing chart I shows the downstream stream resulting therefrom. It may be noted that the packet P2 is no longer inserted between the packets Q3 and Q4, but is attached from the moment t3 after the following packet Q4.

According to a second approach, another transmission control signal ACK can be created which ensures that an inserted packet is in all cases attached to a packet of the upstream stream, but with an attachment before a packet that delimits a void which precedes this packet, this void always being of sufficient size for the packet to be inserted.

This requires the intervention of an additional item of information representative of the size Tp of the packet to be inserted and symbolized by "p+1" in FIG. 3. If the packet size is between (p−1)Te and pTe, the stage ap+1 of the register Ra assumed to be loaded will be the first from the right to take the value 0. Furthermore, the state at 1 of the counterpart stage bp+1 of the register Rb, while the stages of inferior ranks bp, bp−1, etc. are at 0, constitutes an indication that, in the observed window, bp+1 corresponds to the beginning of a packet in transit, that is to say that the stage bp corresponds to the end of a void. To ensure that the packet can be inserted into a void, while being attached before the packet of the upstream stream that succeeds this void, one can take as a transmission control signal ACK the signal ACK2 which takes the value 1 as soon as the logic product VAL.bp+1 switches to 1, ACK2 then remaining at 1 so long as VAL remains at 1.

According to a third approach, a third transmission control signal ACK can be created which ensures that an inserted packet is in all cases attached to a packet of the upstream stream, but with an attachment preferably following a packet which delimits a void succeeding this packet, or, failing this, before a packet that delimits a void preceding this packet. For this, one can take as the transmission control signal ACK the signal ACK1+ACK2, where ACK1 and ACK2 correspond to the logic signals defined above.

This case is illustrated by timing charts A to I in FIG. 7. The signals of timing charts A, B, C and F correspond respectively to those of timing charts B, C, F and H in FIG. 6 of the preceding example and already commented upon.

In addition, timing chart D represents the signal bp+1 which corresponds to the variations as a function of the time of the logic state of the stage bp+1 delayed by the previously defined value DT. The timing charts E, G and H represent respectively the signals VAL, ACK2 and ACK1+ACK2 also delayed by the value DT.

Timing chart I shows the downstream stream that results from the use of ACK1+ACK2 as the transmission control signal ACK. It may be noted that the packet P1 is attached after the packet Q2 from the moment t1, the packet P2 is attached before the packet Q4 from the moment t4 and that a third packet P3 has been able to be attached after the packet Q4 at the moment t3.

As indicated previously, it is necessary that the transmission authorization ACK provoke the transmission of the packet after a certain delay adjusted such that the transmitted packet is attached to one of the packets in transit, "attached" here meaning temporally separated from the packet in transit by a time interval smaller than a determined maximal value, as small as possible. In practice, this determined maximal value must however be greater than another determined minimal value defining a minimal guard time needed to separate any two consecutive packets of the packet streams transported. For example, for an ETHERNET network, this guard time must correspond to 96 bits, that is to say will be set at 96 ns for a rate of 1 Gbit/s and at 9.6 ns for a rate of 10 Gbit/s.

The various functions that can be used in the control module 20 are summarized schematically in FIG. 5 in the form of a logic circuit involving the different signals previously commented upon.

The circuit represented is also intended to be able to select as a transmission control signal ACK either VAL, or ACK1, or ACK2, or ACK1+ACK2. The selection is made by means of three selection binary signals m0, m1, m2 which correspond to the insertion mode signal MD mentioned above with reference to FIG. 3.

The logic circuit comprises a combinative block 27 in order to compute according to the states a1-an and b1-bn the logic value of the validation signal VAL according to the equation previously given.

A selection circuit 28 addressed as a function of the packet size information "p+1" is provided to read the bit bp+1 in the register Rb.

A flip-flop 29 receives the product VAL.b0 on its "setting at 1" input S and the complement of VAL on its "resetting at 0" input R and supplies the signal ACK1.

Another flip-flop 30 receives the product VAL.bp+1 on its "setting at 1" input S and the complement of VAL on its "resetting at 0" input R, and supplies the signal ACK2.

As a function of the selection signals m0, m1, m2, the signals VAL, ACK1 and ACK2 are selectively applied to the input of an OR gate 31 which supplies at the output the signal ACK which will serve as the transmission control signal and the command SHa for offsetting the register Ra.

The complement of ACK serves to validate the parallel loading LD of the register Ra in response to the transmission authorization request signal RQ.

Being able to use m0, m1, m2 to select ACK as transmission control signal, any one of the signals VAL, ACK1, ACK2 or ACK1+ACK2 provides a flexibility of use of the station.

In particular, it is easy to apply a mechanism of the watchdog type which aims to prevent transmissions by the station being blocked for too long. Specifically, by applying one of the transmission control signals ACK1, ACK2 or ACK1+ACK2 which require every inserted packet to be attached, the transmission of a waiting packet can be suspended for a very long duration if this packet is taken into account when in the presence of a very long void due to low transmission activity upstream.

To take account of this situation, the invention provides for a timing device (not shown, but easy to produce) to measure the elapsed time from the moment when the data awaiting transmission are detected corresponding to a packet to be transmitted. Beyond a duration with a determined threshold, the timing device is intended to trigger the transmission of the packet to be transmitted in response merely to the validation signal VAL, independently of the transmission control signal initially chosen. The result is the insertion of an unattached packet, which is a small penalty for any downstream stations since this mechanism comes into play only during periods of light traffic.

The replacement of ACK1, ACK2 or ACK1+ACK2 by VAL and vice-versa will be simply achieved by means of the selection signals m0, m1, m2.

The invention is not limited only to the embodiments described above. In particular, it also relates to WDM networks. For this, simply apply the means described previously to each of the wavelengths provided. Likewise, the invention may apply to any type of modulation used to form the optical signals.

Naturally, the invention may apply just as well to passive networks as to networks having links furnished with amplifiers.

The invention claimed is:

1. A station (4i) for optical transmission network, this network (N) comprising at least said station and an optical link (2) provided for transporting packet streams consisting of successive optical packets (Q1 to Q4) each carried by a common wavelength and being propagated in a given direction, a time interval separating two consecutive packets of a packet stream being called a "void" (V12, V23, V34), said station comprising a transmission device (12-15) coupled to said link at an insertion point (6) and suitable for injecting into the link of the optical packets carried by said common wavelength, the station being provided in order to observe at a detection point (18) of the link situated upstream of said insertion point (6) the "upstream" packet streams transported to this detection point (18) and in order that, as a function of this observation, each packet corresponding to data awaiting transmission and transmitted by said transmission device causes the formation at the insertion point (6) of a "downstream" packet stream, this downstream stream containing said transmitted packet (P1) interposed between first (Q2, Q3) and second (Q3, Q4) packets delimiting a void (V23) of said upstream stream, characterized in that said station comprises a device (17, 11) for detection of said "upstream" packet streams suitable for forming a transmission control signal (ACK1, ACK2, ACK1+ACK2) such that in the case of transmission by the transmission device as a function of said control signal, any packet (P1, P2, P3) transmitted and interposed between said first (Q2, Q3) and second (Q3, Q4) packets delimiting a void is attached to at least one of said first and second packets (Q2, Q4), that is to say is temporally separated either from said first packet (Q2), or from said second packet (Q4) by a time interval less than a maximal determined value.

2. The station as claimed in claim 1, characterized in that said first packet (Q2, Q3, Q4) preceding said second packet (Q3, Q4), said control signal (ACK1) is such that any packet (P1, P2) transmitted as a function of this control signal is attached exclusively to said first packet (Q2, Q4).

3. The station as claimed in claim 1, characterized in that said first packet (Q2, Q3) preceding said second packet (Q3, Q4), said control signal (ACK2) is such that any packet (P2) transmitted as a function of this control signal is attached exclusively to said second packet (Q4).

4. The station as claimed in claim 1, characterized in that said first packet (Q2, Q3, Q4) preceding said second packet (Q3, Q4), said control signal (ACK1+ACK2) is such that any packet (P1, P2, P3) transmitted as a function of this control signal is attached as a priority to said first packet (Q2, Q4).

5. The station as claimed in claim 1, characterized in that it comprises a timing device in order to measure the elapsed time from the moment when the data awaiting transmission corresponding to packet to be transmitted are detected, in that said detection device (17, 11) is suitable for forming a validation signal (VAL) such that in the event of transmission by the transmission device in response to this validation signal, any transmitted packet (P1, P2, P3) is interposed between said first (Q2, Q3) and second (Q3, Q4) packets delimiting a void, in that said timing device is provided in order to trigger the transmission of said packet to be sent in response to said validation signal (VAL), independently of said transmission control signal (ACK1, ACK2, ACK1+ACK2).

6. An optical transmission network, this network (N) comprising stations (4-1 to 4-4) and an optical link (2) provided in order to transport packet streams consisting of successive optical packets (Q1 to Q4) each carried by a common wavelength and being propagated in a given direction, a time interval separating two consecutive packets of a packet stream being called a "void" (V12, V23, V34), characterized in that at least one of said stations complies with claim 1.

* * * * *